United States Patent
Imbrogno et al.

(10) Patent No.: US 12,103,075 B1
(45) Date of Patent: Oct. 1, 2024

(54) METHOD FOR MAKING POWDER METAL PROTOTYPES BY 3-D PRINTING

(71) Applicants: Peter G. Imbrogno, DuBois, PA (US); Kevin A. Bauer, St. Marys, PA (US)

(72) Inventors: Peter G. Imbrogno, DuBois, PA (US); Kevin A. Bauer, St. Marys, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 542 days.

(21) Appl. No.: 17/154,168

(22) Filed: Jan. 21, 2021

Related U.S. Application Data

(60) Provisional application No. 62/964,409, filed on Jan. 22, 2020.

(51) Int. Cl.
*B22F 10/28* (2021.01)
*B22F 10/34* (2021.01)
*B33Y 10/00* (2015.01)
*B33Y 70/10* (2020.01)

(52) U.S. Cl.
CPC .............. *B22F 10/28* (2021.01); *B22F 10/34* (2021.01); *B33Y 10/00* (2014.12); *B33Y 70/10* (2020.01)

(58) Field of Classification Search
CPC .......... B22F 10/28; B22F 10/34; B33Y 10/00; B33Y 70/10
See application file for complete search history.

(56) References Cited

U.S. PATENT DOCUMENTS 4,863,538 A 9/1989 Deckard
2018/0318922 A1* 11/2018 Valls Anglés ........... C22C 19/03

* cited by examiner

*Primary Examiner* — Anthony M Liang
*Assistant Examiner* — Danny N Kang
(74) *Attorney, Agent, or Firm* — Alvin T. Rockhill

(57) ABSTRACT

This invention is based upon the discovery that prototype parts having physical characteristics that mimic those of powder metal parts can be made by laser powder bed fusion techniques in cases where water or gas atomized powder metals are employed in the laser fusion procedure. More specifically, parts made utilizing water or gas atomized powder metals in such additive procedures, using unique printing parameters to create desired porosity levels within the component, have densities and microstructures that approximate those made using conventional powder metal manufacturing techniques. For instance, such parts can be made so as to have a density which is within the range of about 6.0 g/cc to 7.8 g/cc and which have physical properties that are equivalent to those of powder metal parts of comparable densities.

19 Claims, No Drawings

METHOD FOR MAKING POWDER METAL PROTOTYPES BY 3-D PRINTING

This application claims the benefit of U.S. Provisional Patent Application Ser. No. 62/964,409, filed on Jan. 22, 2020. The teachings of U.S. Provisional Patent Application Ser. No. 62/964,409 are incorporated by reference herein in their entirety.

FIELD OF THE INVENTION

This invention relates to a method for making prototypes of powder metal parts by a laser powder bed fusion technique which employs selective laser melt technology. The prototype parts made by this process are of a density and have physical properties which closely approximate those which are actually made using conventional powder metal manufacturing procedures.

BACKGROUND OF THE INVENTION

In many cases, conventional powder metal technology can be utilized in manufacturing a wide variety of parts at high volume levels at a reduced cost by eliminating or reducing the labor associated with casting, forging, and machining. In some cases, parts having intricate designs simply cannot be made by casting, forging or machining. In general, powder metal parts can typically be made in large quantities at a reduced cost by virtue of requiring less labor. Additionally, powder metallurgy can provide significant benefits in minimizing material and energy waste based on its features as a near-net shape technology compared to other manufacturing technologies. Accordingly, for economic and practical reasons, powdered metal parts are commonly used in manufacturing a wide variety of parts for use in countless applications.

Manufacturing parts using powder metal technology typically involves the steps of (1) Making compaction tooling (molding die, core rod, top and bottom punches) to produce the net shape of the desired component. (2) placing a metal powder composition into a molding die, (3) compressing the metal powder in the mold die into the shape of the desired part under a pressure of 20 tons per square inch to 70 tons per square to make a preformed part (green metal part), (4) removing the green metal part from the mold die, and (5) sintering the green metal part at an elevated temperature which is typically within the range of about 60% to about 90% of the melting point of the metal composition to produce the sintered metal part. The sintering temperature will normally be in the range of 1830° F. (1000° C.) to 2450° F. (1343° C.). Conversely, a blank or puck may be molded in a round die using round top and bottom punches. The blanks will be sintered and machined, via one or more processes, including, but not limited to, hobbing, turning, EDM'ed, and drilling, to produce the desired component shape.

In some cases, after the powder metal part has been sintered it is necessary to machine the part to provide it with required design elements, to attain needed tolerances (dimensional accuracy), and to provide it with a specific needed precision geometry, such as cross holes, transverse grooves, and the like. Accordingly, the part may need to be drilled or ground to meet required specifications and/or to impart needed design features. For instance, it is frequently necessary to grind the gear teeth of sintered powder metal gears to attain the degree of surface smoothness that is required for the gear. Sintered powder metal parts are also frequently drilled or cut to impart the design features needed in the final product.

Making the compaction tooling that is required in manufacturing to mold the prototype part is normally labor intensive, costly, and time consuming. However, such tooling is required to make even one prototype part for testing and evaluation. This leads to a high cost and frequently to time delays in providing powder metal prototype parts for evaluation and testing for suitability for use in specific applications.

Powder bed fusion (PBF) is a type of additive manufacturing (AM) where a heat source, such as a laser, is used to melt a powder of building material within the bed to form a desired three-dimensional structure upon cooling. As with all additive manufacturing procedures the desired object (part) is built layer-by-layer with additional powder of the building material being spread over the build area after each pass of the heat source over the build area. The heat source is applied to particles contained within a powder bed, which gradually indexes down as each layer is completed and new powder is spread over the build area. Powder bed fusion techniques offer the advantage over many other additive manufacturing procedures in that they do not require support structures, since overhangs and unconnected islands are supported by the surrounding unfused powder bed. This in turn allows for more complex geometric structures to be made because removal of support structures after the build is not necessary. Laser Powder-Bed Fusion (LPBF) is capable of producing net and near-net shape parts with dimensional tolerances of less than 0.1 mm.

U.S. Pat. No. 4,863,538 discloses a method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed. The powder can comprise either plastic, metal, ceramic, or polymer substance. In the preferred embodiment, the aim of the laser is directed in a continuous raster scan and the laser turned on when the beam is aimed with the boundaries of the particular cross-section being formed.

U.S. Pat. No. 4,863,538 more specifically discloses a method of producing a part comprising the steps of: depositing a first portion of powder onto a target surface; scanning the aim of a directed energy beam over the target surface; sintering a first layer of the first powder portion corresponding to a first cross-sectional region of the part by operating the beam when the aim of the beam is within boundaries defined by said first cross-sectional region; depositing a second portion of powder onto the first sintered layer; scanning the aim of a directed energy beam over the first sintered layer; sintering a second layer of the second powder portion corresponding to a second cross-sectional region of the part by operating the beam when the aim of the beam is within boundaries defined by said second cross-sectional region, including the sub-step of joining the first and second layers during the sintering of the second layer; and depositing successive portions of powder onto the previous sintered layers and sintering each successive portion to produce successive sintered layers joined to a previous sintered layer and a part comprising a plurality of sintered layers.

Prototypes can, of course, be made by three-dimensional (3-D) printing without the need to make special compaction tooling. For instance, laser powder bed fusion techniques can frequently be used in making prototype parts. This can often be done at low volume levels at a reasonable cost and without encountering the time delays which are normally associated with making the mold needed in making actual powder metal parts. However, the implementation of laser powder bed fusion techniques leads to prototype parts of high density. For example, the metal in such parts typically has a density which is within the range of about 7.80 g/cc to 7.90 g/cc. For this reason, such prototype parts made by laser powder bed fusion techniques do not have densities and microstructures that assimilate those of parts which are actually made by conventional powder metal techniques. Accordingly, such prototype parts made by laser powder bed fusion techniques do not accurately reflect the performance and suitability of parts made using conventional powder metal for used in a specific application.

It would be desirable to quickly and efficiently produce prototypes of powder metal parts using laser powder bed fusion techniques with those parts accurately mimicking the properties of actually powder metal parts. However, heretofore such a technique has been elusive.

SUMMARY OF THE INVENTION

This invention is based upon the unexpected discovery that prototype parts having physical characteristics that mimic those of conventional powder metal parts can be made by laser powder bed fusion techniques in cases where water or gas atomized powder metals are employed, in the laser fusion procedure. More specifically, parts made utilizing water or gas atomized powder metals in such additive addition procedures, using unique printing parameters to create desired porosity levels within the component, have densities and microstructures that approximate those made using conventional powder metal manufacturing techniques. For instance, such parts can be made so as to have a density which is within the range of about 6.0 g/cc to 7.80 g/cc and which have physical properties that are equivalent to those of conventionally processed powder metal parts at comparable densities. Accordingly, prototype parts can be made by laser powder bed fusion techniques in accordance with this invention using water or gas atomized powder metals and such prototype parts have properties that are equivalent to those of such parts which are actually made employing powder metal manufacturing procedures.

The present invention discloses a process for manufacturing a prototype part by selective laser melt technology, said process comprising sequentially building the prototype part layer by layer, while purposefully leaving voids (representing porosity in the final component), wherein a laser beam is applied to a bed of metal powder to build each layer. wherein additional metal powder as sequentially applied to the bed of metal powder as the prototype part is built layer by layer.

The subject invention further reveals a method of making a prototype part of less than theoretical density, that is, of the material system being printed, comprising the steps of: depositing a first portion of powder onto a target surface. while inducing porosity into this layer and all subsequent layers, wherein the powder in a powder metal which is comprised of water or gas atomized metal particles; scanning the aim of a directed energy beam over the target surface; sintering a first layer of the first powder portion corresponding to a first cross-sectional region of the part by operating the beam when the aim of the beam is within boundaries defined by said first cross-sectional region; depositing a second portion of powder onto the first sintered layer; scanning the aim of a directed energy beam over the first sintered layer; sintering a second layer of the second powder portion, corresponding to a second cross-sectional region of the part by operating the beam when the aim of the beam is within boundaries defined by said second cross-sectional region, including the substep of joining the first and second layers during the sintering of the second layer; and depositing successive portions of powder onto the previous sintered layers and sintering each successive portion to produce successive sintered layers joined to a previous sintered layer to form the prototype part which is comprised the plurality of sintered layers.

DETAILED DESCRIPTION OF THE INVENTION

The method for manufacturing prototype parts in accordance with this invention by laser powder bed fusion utilizes water or gas atomized metal powers, such as water or gas atomized steel powders. Conventional water or gas atomization techniques can be used in making the steel powder which is employed in the selective laser melt additive manufacturing method of the subject invention.

A wide variety of iron base metals can be used in making the water or gas atomized metal powder with these metals typically being iron-carbon, iron-copper, or iron-nickel alloys. It should also be understood that the water or gas atomized metal powder employed in the method of this invention can optionally be a blend of water or gas atomized metal powders of different metal alloys. Pre-alloyed powders, such as an iron-nickel-molybdenum steel, wherein the alloy is formed in the melt prior to atomization and each powder particle is a small ingot having the same composition as the melt can also be used. As used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, silicon, and chromium. Copper and nickel can also optionally be present in pre-alloyed base metal powder compositions. Typically, the base metal powder will contain at least 95 weight percent iron and will preferably contain at least 97 weight percent iron.

Some representative examples of base steels that can be used in making the water or gas atomized steel powder, but not limited to, include MPIF/ASTM F-0000, MPIF/ASTM F-0005, MPIF/ASTM F-0008, MPIF/ASTM FC-0200, MPIF/ASTM FC-0205, MPIF/ASTM FC-0208, MPIF/ASTM FC-0505, MPIF/ASTM FC-0808, MPIF/ASTM FN0200, MPIF/ASTM FN-0205 MPIF/ASTM FN-0208, MPIF/ASTM FN-0405, and MPIF/ASTM FN-0408. For instance, the based steel powder can be comprised of iron and up to 0.3 weight percent carbon, such as 99.7 weight percent to 99.9 weight percent iron and 0.1 weight percent to 0.3 weight percent carbon. The water or gas atomized metal particles can also be comprised 0.3 weight percent to 0.6 weight percent carbon with the balance of the alloy being iron. The water or gas atomized metal particles can also be comprised 0.6 weight percent to 0.9 weight percent carbon with the balance of the alloy being iron. Such alloys can be further comprised of 1.5 weight percent to 3.9 weight percent copper. Nickel can optional also be included in iron-carbon-nickel alloys at levels which are within the range of 1 weight percent to 3 weight percent or optionally at higher levels which are within the range of 3 weight percent to 5.5 weight percent. For instance, the steel alloy can be MPIF/ASTM FN-0205 which contains 0.3 weight percent to 0.6 weight percent carbon, 1 weight percent to 3 weight percent nickel, and up to 2.5 weight percent copper or in the alternative it can be MPIF/ASTM FN-0408 which contains 0.6 weight percent to 0.9 weight percent carbon, 3 weight percent to 5.5 weight percent nickel, and up to 2 weight percent copper.

As previously explained, in accordance with this invention prototype parts are made utilizing a selective laser melt process which is carried out in a bed of the water or gas atomized metal powder. This method utilizes a directed energy beam, such as a laser, and is adaptable to produce three dimensional part of virtually any geometric design. The method of the present invention is an additive process, with the metal powder dispensed into a target area (bed) where the laser selectively sinters the powder to produce a sintered layer. A layer-wise process is employed with sequential layers being joined together until the completed part has been produced.

The apparatus utilized includes a laser or other directed energy source which is selectable for emitting a beam in a target area (bed) where the part is produced. A powder dispenser system deposits powder into the target area. A laser control mechanism operates to move the aim of the laser beam and modulates the laser to selectively sinter a layer of powder dispensed into the target area. The control mechanism operates to selectively sinter only the powder disposed within defined boundaries to produce the desired layer of the part. The control mechanism operates the laser to selectively sinter sequential layers of powder, producing a completed part comprising a plurality of layers sintered together. The defined boundaries of each layer correspond to respective cross-sectional areas of the part. Preferably, the control mechanism includes a computer, such as a CAD/CAM system, to form the geometric boundaries of layer as the part is being build. That is, given the overall dimensions and configuration of the part, the computer determines the defined boundaries for each layer and operates the laser control mechanism in accordance with the defined boundaries. Alternatively, the computer can be initially programmed with the defined boundaries of each layer.

In a preferred form, the laser control mechanism includes a mechanism for directing the laser beam in the target area and a mechanism for modulating the laser beam on and off to selectively sinter the powder in the target area. In one embodiment, the directing mechanism operates to move the aim of the laser beam in a continuous raster scan of target area. The modulating mechanism turns the laser beam on and off so that the powder is sintered only when the aim of the laser beam is within the defined boundaries for the particular layer. Alternatively, the directing mechanism aims the laser beam only within the defined boundaries for the particular layer so that the laser beam can be left on continuously to sinter the powder within the defined boundaries for the particular layer.

In a preferred embodiment, the directing mechanism moves the laser beam in a repetitive raster scan of the target area using a pair of mirrors driven by galvonometers. The first mirror reflects the laser beam to the second mirror which reflects the beam into the target area. Shifting movement of the first mirror by its galvonometer shifts the laser beam generally in one direction in the target area. Similarly, shifting movement of the second mirror by its galvonometer shifts the laser beam in the target area in a second direction. Preferably, the mirrors are oriented relative to each other so that the first and second directions are generally perpendicular to each other. Such an arrangement allows for many different types of scanning patterns of the laser beam in the target area, including the raster scan pattern f the preferred embodiment of the present invention.

The method of part production of the present invention includes the steps of depositing a first portion of powder onto a target surface, as to leave the desired percentage of voids to correlate with the final component target porosity/density, scanning the aim of a directed energy beam (preferably a laser) over the target surface, and sintering a first layer of the first powder portion on the target surface. The first layer corresponds to a first cross-sectional region of the part. The water or gas atomized metal powder is sintered by operating the directed energy source when the aim of the beam is within the boundaries defining the first layers. A second portion of powder is deposited onto the first sintered layer, as to leave the desired percentage of voids to correlate with the final component target porosity/density, and the aim of the laser beam scanned over the first sintered layer. A second layer of the second powdered portion is sintered by operating the directed energy source when the aim of the beam is within the boundaries defining the second layer. Sintering of the second layer also joins the first and second layers into a cohesive mass. Successive portions of powder are deposited onto the previously sintered layers, each layer being sintered in turn. In one embodiment, the powder is deposited continuously into the target.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this experiment a prototype part was made by three-dimensional printing utilizing a selective laser melt process which was carried out in a bed of water-atomized MPIF FC-0208 carbon steel powder. The prototype part made had a density of about 6.9 g/cc, due to purposefully inducing porosity into the selective laser melt component by tailoring the printing parameters to successfully achieve this novel goal of closely approximating the density of a part as made by conventional powder metal technology (by making a green preform and subsequently sintering the preform). This experiment shows that a water-atomized MPIF FC-0208 carbon steel powder could be used to produce a powder metal part by the selective laser melt process to the density of the a part as made by a conventional powder metal technology.

Example 2

In this experiment a prototype part was made by three-dimensional printing utilizing a selective laser melt process which was carried out in a bed of water-atomized MPIF F-0000 iron powder. The prototype part made had a density of about 6.9 g/cc, due to purposefully inducing porosity into the selective laser melt component by tailoring the printing parameters to successfully achieve this novel goal of closely approximating the density of a part as made by conventional powder metal technology (by making a green preform and subsequently sintering the preform). This experiment shows that the water-atomized MPIF F-0000 iron powder could be used to produce the density of the powder metal part made by the selective laser melt process to approximate that of the part as made by a conventional powder metal technology.

While certain representative embodiments and details have been shown for the purpose of illustrating the subject invention, it will be apparent to those skilled in this art that various changes and modifications can be made therein without departing from the scope of the subject invention.

What is claimed is:

1. A method of making a prototype part of less than theoretical density comprising the steps of: (1) depositing a first portion of powder as a first layer onto a target surface, while inducing porosity into the first layer and all subsequent layers, wherein the powder is a powder metal composition which is comprised of water or gas atomized metal particles, wherein atomized metal particles have the same composition; (2) scanning the aim of a directed energy beam over the target surface; (3) sintering a first layer of the first portion of powder corresponding to a first cross-sectional region of the part by operating the beam with the aim of the beam is being within boundaries defined by said first cross-sectional region to make a first sintered layer; (4) depositing a second portion of the powder onto the first sintered layer; (5) scanning the aim of a directed energy beam over the first sintered layer; (6) sintering a second layer of the second powder portion, corresponding to a second cross-sectional region of the part by operating the beam wherein the aim of the beam is within boundaries defined by said second cross-sectional region with the first and second layers being joined during the sintering of the second layer; and (7) depositing successive portions of powder onto the previous sintered layers and sintering each successive portion of powder to produce successive sintered layers joined to a previous sintered layer to form the prototype part which is comprised a plurality of sintered layers, wherein the prototype part has a density which is within the range of 6.0 g/cc to 7.8 g/cc.

2. The method as specified in claim 1 wherein the directed energy beam is a laser beam.

3. The process as specified in claim 2 wherein the prototype part has properties that mimic those of a conventional powder metal part of comparable density.

4. The process as specified in claim 3 wherein the prototype part has a density which is within the range of 6.8 g/cc to 7.0 g/cc, and wherein the water or gas atomized metal particles are comprised of iron and 0.3 weight percent to 0.9 weight percent carbon.

5. The process as specified in claim 4 wherein the water or gas atomized metal particles consist of iron, up to 0.3 weight percent carbon, and optionally sulfur, phosphorus, manganese, molybdenum, silicon, chromium, copper, and nickel.

6. The process as specified in claim 5 wherein the water or gas atomized metal particles consist of iron, 0.3 weight percent to 0.6 weight percent carbon, and optionally sulfur, phosphorus, manganese, molybdenum, silicon, chromium, copper, and nickel.

7. The process as specified in claim 5 wherein the water or gas atomized metal particles consist of iron, 0.6 weight percent to 0.9 weight percent carbon, and optionally sulfur, phosphorus, manganese, molybdenum, silicon, chromium, copper, and nickel.

8. The process as specified in claim 7 wherein the water or gas atomized metal particles are further comprised of 1.5 weight percent to 3.9 weight percent copper.

9. The process as specified in claim 6 wherein the water or gas atomized metal particles are further comprised of 1.5 weight percent to 3.9 weight percent copper.

10. The process as specified in claim 1 wherein the prototype part has a density which is within the range of 6.8 g/cc to 7.2 g/cc.

11. The process as specified in claim 1 wherein the water or gas atomized metal particles are water atomized metal particles.

12. The process as specified in claim 1 wherein the water or gas atomized metal particles are gas atomized metal particles.

13. The process as specified in claim 1 wherein the metal particles are comprised of iron, 0.3 weight percent to 0.6 weight percent carbon, 1 weight percent to 3 weight percent nickel, and 0.5 weight percent to 2.5 weight percent copper.

14. The process as specified in claim 1 wherein the metal particles are comprised of iron, 0.6 weight percent to 0.9 weight percent carbon, 3 weight percent to 5.5 weight percent nickel, and 0.5 weight percent to 2 weight percent copper.

15. A method of making a metal prototype part of less than theoretical density by a three-dimensional printing process comprising depositing and sintering successive layers of an atomized powder metal composition to make the metal prototype part, wherein the metal prototype part has a density which is within the range of 6.0 g/cc to 7.8 g/cc, wherein the atomized powder metal composition is comprised of water or gas atomized metal particles, wherein atomized metal particles have the same composition, and wherein the successive layers of the atomized powder metal composition are sintered with a directed energy beam.

16. The method as specified in claim 15 wherein the directed energy beam is a laser beam.

17. The method as specified in claim 16 wherein the water or gas atomized metal particles are water atomized metal particles.

18. The method as specified in claim 16 wherein the water or gas atomized metal particles are gas atomized metal particles.

19. The method as specified in claim 1 wherein the atomized metal particles consist of MPIF FC-0208 carbon steel powder.

* * * * *